(12) United States Patent
Kim et al.

(10) Patent No.: US 11,277,495 B2
(45) Date of Patent: Mar. 15, 2022

(54) SYSTEM AND METHOD FOR PROVIDING MICROSERVICE-BASED DEVICE CONTROL INTERFACE

(71) Applicant: Electronics and Telecommunications Research Institute, Daejeon (KR)

(72) Inventors: Geun Yong Kim, Gwangju (KR); Byung Hee Son, Gwangju (KR); Gi Ha Yoon, Gwangju (KR); Ryang Soo Kim, Gwangju (KR); Jae In Kim, Gwangju (KR); Chor Won Kim, Gwangju (KR); Hee Do Kim, Seoul (KR); Hark Yoo, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 79 days.

(21) Appl. No.: 16/707,286

(22) Filed: Dec. 9, 2019

(65) Prior Publication Data

US 2020/0186622 A1   Jun. 11, 2020

(30) Foreign Application Priority Data

Dec. 10, 2018  (KR) .......................... 10-2018-0158084
Oct. 21, 2019  (KR) .......................... 10-2019-0130886

(51) Int. Cl.
*H04L 29/08* (2006.01)
*H04L 29/06* (2006.01)
(Continued)

(52) U.S. Cl.
CPC ............... *H04L 67/34* (2013.01); *G06F 8/65* (2013.01); *G06F 9/45558* (2013.01);
(Continued)

(58) Field of Classification Search
CPC ......... H04L 67/34; H04L 67/40; H04L 67/42; H04L 12/66; G06F 8/60–65; G06F 9/455–45558
See application file for complete search history.

(56) References Cited

U.S. PATENT DOCUMENTS 9,948,553  B2   4/2018   Kwak et al.
10,560,905 B2   2/2020   Ryoo et al.
(Continued)

FOREIGN PATENT DOCUMENTS

KR   10-2008-0101553 A   11/2008
KR      10-1632710 B1     6/2016
(Continued)

OTHER PUBLICATIONS

Ji Eun Kim et al., "Seamless Integration of Heterogeneous Devices and Access Control in Smart Homes", 2012, IEEE Computer Society, pp. 206-213 (Year: 2012).*
(Continued)

*Primary Examiner* — Clayton R Williams
(74) *Attorney, Agent, or Firm* — NSIP Law

(57) ABSTRACT

Provided are a system and method for providing a microservice-based device control interface. The system for providing a microservice-based device control interface includes a Docker registry server in which resources required for providing a device control interface are located and a gateway which receives and installs resources and provides a device control interface using a Docker-based microservice structure.

10 Claims, 6 Drawing Sheets

(51) Int. Cl.
*H04L 12/66* (2006.01)
*G06F 9/455* (2018.01)
*G06F 8/65* (2018.01)
*H04L 67/00* (2022.01)
*H04L 67/01* (2022.01)
*H04L 67/133* (2022.01)

(52) U.S. Cl.
CPC .............. *H04L 12/66* (2013.01); *H04L 67/40* (2013.01); *H04L 67/42* (2013.01); *G06F 2009/45575* (2013.01); *G06F 2009/45595* (2013.01)

(56) References Cited

U.S. PATENT DOCUMENTS

| | | | |
|---|---|---|---|
| 2013/0198796 A1* | 8/2013 | Brooks | H04J 14/0298 725/129 |
| 2014/0052976 A1* | 2/2014 | Marino | G06F 21/572 713/2 |
| 2016/0134527 A1 | 5/2016 | Kwak et al. | |
| 2017/0099176 A1* | 4/2017 | Jain | H04L 67/12 |
| 2018/0198641 A1 | 7/2018 | Gilani et al. | |
| 2018/0316543 A1 | 11/2018 | Hwang | |
| 2019/0168098 A1* | 6/2019 | Kinsella | F41J 5/04 |
| 2020/0374205 A1* | 11/2020 | Sharma | H04L 43/065 |

FOREIGN PATENT DOCUMENTS

| | | |
|---|---|---|
| KR | 10-2017-0076154 A | 7/2017 |
| KR | 10-2018-0084501 A | 7/2018 |
| KR | 10-1885586 B1 | 8/2018 |

OTHER PUBLICATIONS

Dimitar Vltchev et al., "Service Gateway Architecture fora Smart Home", Apr. 2002, IEEE Communications Magazine, pp. 126-132 (Year: 2002).*

* cited by examiner

SYSTEM AND METHOD FOR PROVIDING MICROSERVICE-BASED DEVICE CONTROL INTERFACE

CROSS-REFERENCE TO RELATED APPLICATION

This application claims priority to and the benefit of Korean Patent Application No. 10-2018-0158084, filed on Dec. 10, 2018, and Korean Patent Application No. 10-2019-0130886, filed on Oct. 21, 2019, the disclosure of which is incorporated herein by reference in its entirety.

BACKGROUND

1. Field of the Invention

The present invention relates to a system and method for providing a microservice-based device control interface.

2. Discussion of Related Art

According to the Internet of things (IoT) technology of a related art, data acquired from objects passes through a gateway and is transferred to a cloud server.

According to the related art, a data transfer process requires much time, the cost of using communication infrastructure required for data transfer is high, and a communication bandwidth is insufficient.

SUMMARY OF THE INVENTION

The present invention is directed to providing a system and method for flexibly providing various legacy interfaces in device control in which various communication interfaces are used together.

According to an aspect of the present invention, there is provided a system for providing a microservice-based device control interface, the system including: a Docker registry server in which resources required for providing a device control interface are located; and a gateway configured to receive and install resources and provide a device control interface using a Docker-based microservice structure.

According to another aspect of the present invention, there is provided a gateway device for providing a microservice-based device control interface, the gateway device including: an input section configured to receive resources for installing a device interface; a memory configured to store a program for providing a microservice-based device control interface by using the resources; and a processor configured to execute the program. The processor installs software required for operation in a Docker container using a Docker-based microservice structure and provides a device control interface.

According to another aspect of the present invention, there is provided a method of providing a microservice-based device control interface, the method including: receiving resources required for implementing a device interface from a Docker registry server and installing the resources; determining whether a gateway hardware state satisfies requirements of the device interface; when it is determined that the gateway hardware state satisfies the requirements of the device interface, downloading a programmable semiconductor image to a flash memory; rebooting a system to execute device interface logic; and controlling and monitoring a control target device.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The aforementioned objects, other objects, advantages, and features of the present invention and methods for achieving them will be made clear from embodiments described in detail below with reference to the accompanying drawings.

However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the art to which the present invention pertains. The present invention is defined by the claims.

Meanwhile, terms used herein are for the purpose of describing embodiments and are not intended to limit the present invention. As used herein, the singular forms are intended to include the plural forms as well unless the context clearly indicates otherwise. The terms "comprises" and/or "comprising" used herein indicate the presence of stated elements, steps, operations, and/or devices and do not preclude the presence or addition of one or more other elements, steps, operations, and/or devices.

Hereinafter, the reason that the present invention is proposed will be described first to help those of ordinary skill in the art with understanding, and then exemplary embodiments of the present invention will be described.

The Internet of Things (IoT) is generally divided into consumer IoT and industrial IoT (IIoT).

In particular, IIoT includes numerous physical measurement apparatuses, such as sensors, actuators, and devices, and various interfaces are used for communication.

Currently used communication interfaces are generally referred to as legacy interfaces.

Due to characteristics of industrial equipment control, when a technology is used for a long period of time and determined to be reliable, the technology is not easily replaced with a new technology.

Further, various types of communication interfaces are currently used in industrial sites and are dependent on their manufacturers in many cases. Consequently, it is necessary to use a gateway device so that data may be acquired in a cloud server.

Figure 1:
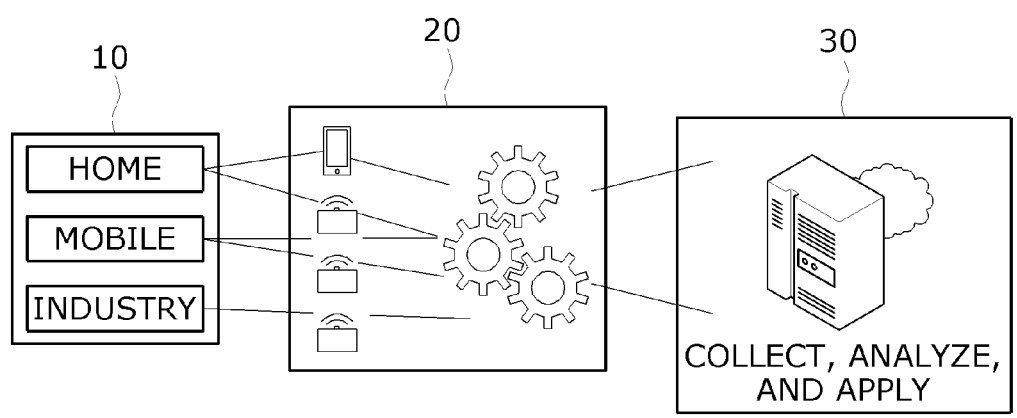
FIG. 1 shows three layers of the Internet of things (IoT) architecture according to a related art.

FIG. 1 shows three layers of the IoT architecture according to a related art.

As shown in FIG. 1, data acquired from objects 10 through various communication interfaces is connected to the Internet through a gateway 20 and connected to a cloud server 30 which provides applications and services.

In particular, the gateway 20 used in IIoT is required to install software for processing communication protocols as well as hardware in order to accommodate various legacy communication interfaces used for device control and monitoring.

Recently, it is being considered problematic that data acquired from industrial equipment is transferred to the cloud server 30 through the gateway 20 for a long period of time, the cost of using communication infrastructure required for data transfer is high, and a communication bandwidth is insufficient.

To solve these problems, edge computing technology is in the limelight, and many hardware and software companies are working hard to develop a gateway at which edge computing is implemented.

With the necessity of edge computing, a gateway which has only served for data transfer is required to have software and hardware functions, such as an artificial intelligence (AI) engine and a database, required for edge computing. In particular, a flexible interface expansion function is necessary for connection with various pieces of industrial equipment.

The present invention is proposed to solve the above-described problem. The present invention provides a system and method in which it is possible to change communication interfaces and protocols on the basis of one gateway as necessary and more specifically provides, as an IoT solution, a system and method for flexibly providing various legacy interfaces, such as RS232, CAN, RS485, and Modbus/RTP, by using one system particularly in industrial equipment control in which various communication interfaces are used together.

Figure 2:
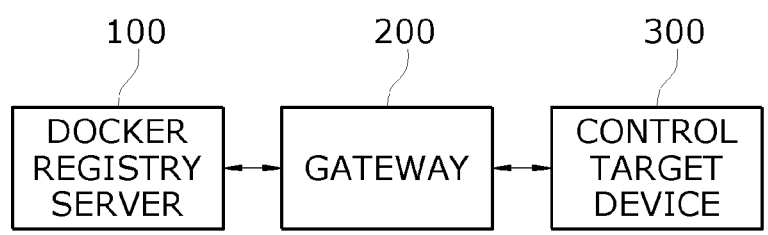
FIG. 2 is a block diagram of a system for providing a microservice-based device control interface according to an exemplary embodiment of the present invention.

FIG. 2 is a block diagram of a system for providing a microservice-based device control interface according to an exemplary embodiment of the present invention.

The system for providing a microservice-based device control interface according to an exemplary embodiment of the present invention includes a Docker registry server 100 in which resources required for providing a device control interface are located and a gateway 200 which receives and installs resources and provides a device control interface using a Docker-based microservice structure.

In the Docker registry server 100, resources including software and programmable semiconductor images required for communication protocols are located.

The gateway 200 installs software, a programmable semiconductor image, and image fusing software required for a communication protocol in a Docker container.

The gateway 200 checks hardware state information and determines whether a hardware state satisfies requirements of a device interface to be installed.

The gateway 200 downloads a programmable semiconductor image to a flash memory and executes device interface logic through a system reboot.

The gateway 200 is hardware dependent on a control target device and implements a device interface by using a device-dependent circuit and connector which is removable as necessary.

The gateway 200 controls and monitors a control target device 300 and provides a service by transferring acquired data to another microservice in the Docker container.

Figure 3:
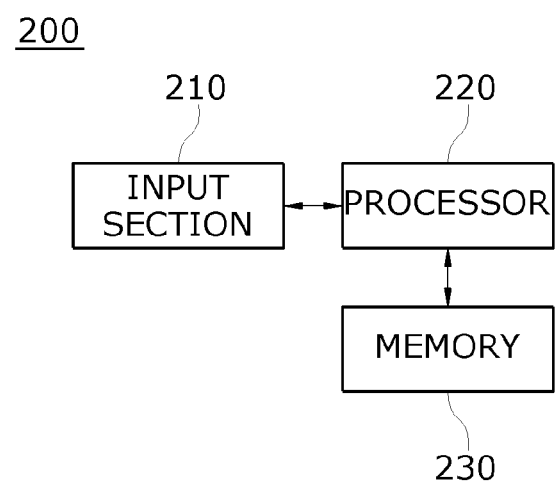
FIG. 3 is a block diagram of a gateway according to an exemplary embodiment of the present invention.

FIG. 3 is a block diagram of a gateway according to an exemplary embodiment of the present invention.

A gateway device for providing a microservice-based device control interface according to an exemplary embodiment of the present invention includes an input section 210 which receives resources for installing a device interface, a memory 230 which stores a program for providing a microservice-based device control interface by using the resources, and a processor 220 which executes the program. The processor 220 installs software required for operation in a Docker container using a Docker-based microservice structure and provides a device control interface.

The input section 210 receives resources from a Docker registry server, and the processor 220 installs software and a programmable semiconductor image required for a communication protocol and image fusing software in the Docker container.

The processor 220 checks hardware state information including at least one of a programmable semiconductor model, the number of gates, and an interface standard.

The processor 220 executes the device control interface using interface protocol software installed in the Docker container and provides an interface for a control target device using a device-dependent circuit and connector connected through a general-purpose input/output (GPIO).

The processor 220 controls and monitors the control target device through the interface protocol software and transfers acquired data to another microservice installed in the Docker container.

Figure 4:
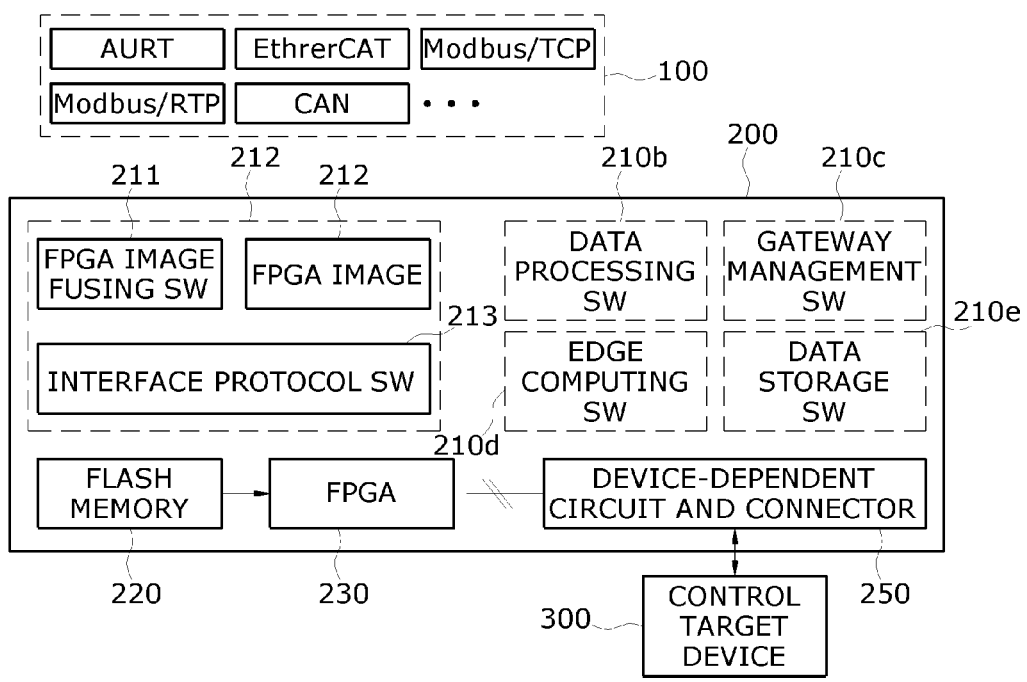
FIG. 4 is a detailed block diagram of a system for providing a microservice-based device control interface according to an exemplary embodiment of the present invention.

FIG. 4 is a detailed block diagram of a system for providing a microservice-based device control interface according to an exemplary embodiment of the present invention.

According to an exemplary embodiment of the present invention, software of the gateway 200 uses a Docker-based microservice structure.

In each of Docker containers 210a, 210b, 210c, 210d, and 210e, software required for operation of the gateway 200 is installed, and the pieces of software exchange data with each other through a RESTful connection.

In the Docker registry server 100, software and programmable semiconductor (field programmable gate array (FPGA)) images required for communication protocols, such as UART, CAN, Modbus, and EtherCAT, which will be downloaded to a Docker container of the gateway 200, are located.

The gateway 200 installs an FPGA image 212, FPGA image fusing software 211, and interface protocol software 213 required for implementing a device interface in the Docker container 210a of an interface implementation section.

When installation of the FPGA image 212, the FPGA image fusing software 211, and the interface protocol software 213 is finished, the FPGA image fusing software 211 checks a hardware state of the gateway 200.

Hardware state information of the gateway 200 includes an FPGA model, the number of gates corresponding to the FPGA model, and information on supportable FPGA interface standards, and the gateway 200 does not proceed with installation any more when a hardware state does not satisfy requirements of a device interface to be installed.

When it is determined that the hardware state satisfies the requirements of the device interface to be installed as a hardware state check result of the gateway 200, the FPGA image fusing software 211 downloads the FPGA image 212 to a flash memory 220.

When the process of downloading the FPGA image 212 to the flash memory 220 is finished without an error, the system is rebooted.

When the system is rebooted, the FPGA image 212 stored in the flash memory 220 is downloaded to an FPGA 230 and executes newly installed device interface logic.

The interface protocol software 213 installed in the Docker container 210a of the interface implementation section in the gateway 200 executes the device interface through FPGA control.

A device-dependent circuit and connector 250 connected through a GPIO 240 of the FPGA 230 is hardware, such as a voltage level converter, dependent on the control target device 300 and is manufactured to be removable as necessary.

Since it is possible to reallocate functions to GPIO pins of the FPGA 230 according to logic implemented by the FPGA 230, various device interfaces may be implemented with the device-dependent circuit and connector 250.

The gateway 200 controls and monitors the control target device 300 through the interface protocol software 213, transfers data acquired from the device to other microservices in the Docker containers 210b, 210c, 210d, and 210e, and uses the data to provide various services.

Referring to FIG. 4, data processing software, edge computing software, gateway management software, and data storage software are shown as examples of microservices, and these microservices may be added or removed as necessary.

Figure 5:
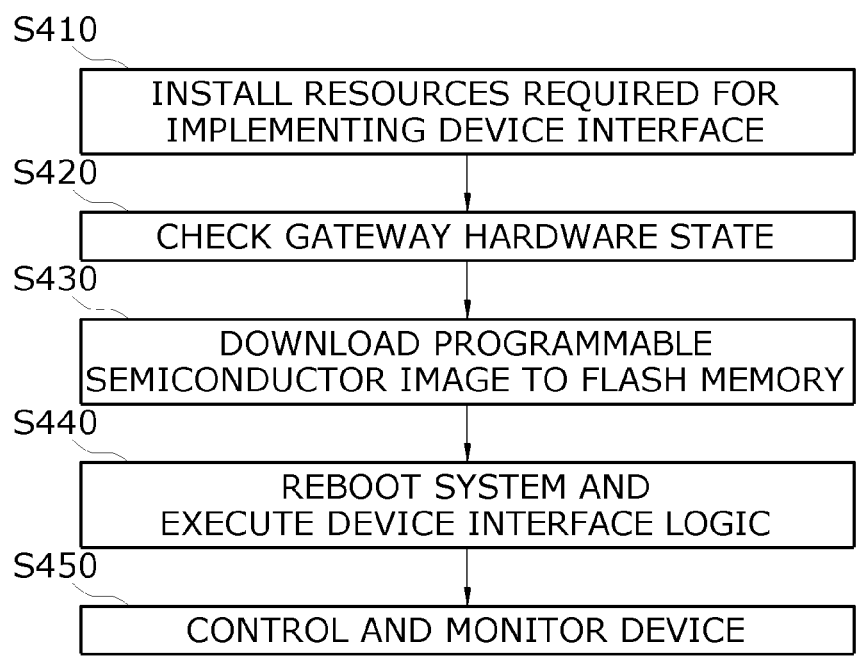
FIG. 5 is a flowchart illustrating a method of providing a microservice-based device control interface according to an exemplary embodiment of the present invention.

FIG. 5 is a flowchart illustrating a method of providing a microservice-based device control interface according to an exemplary embodiment of the present invention.

A method of providing a microservice-based device control interface according to an exemplary embodiment of the present invention includes an operation of receiving resources required for implementing a device interface from a Docker registry server and installing the resources (S410), an operation of determining whether a gateway hardware state satisfies requirements of the device interface (S420), an operation of downloading a programmable semiconductor image to a flash memory when it is determined that the gateway hardware state satisfies the requirements of the device interface (S430), an operation of rebooting a system to execute device interface logic (S440), and an operation of controlling and monitoring a control target device (S450).

In operation S410, resources including software and a programmable semiconductor image required for a communication protocol are received.

In operation S420, hardware state information including at least one of a programmable semiconductor model, the number of gates, and an interface standard is checked.

In operation S440, device interface logic is executed by using the interface protocol software installed in a Docker container, and an interface for a control target device is provided by using a device-dependent circuit and connector connected through a GPIO.

In operation S450, data acquired from the control target device is transferred to another microservice installed in the Docker container.

Meanwhile, the method of providing a microservice-based device control interface according to an exemplary embodiment of the present invention may be implemented in a computer system or recorded in a recording medium. The computer system may include at least one processor, a memory, a user input device, a data communication bus, a user output device, and a repository. The aforementioned elements perform data communication with each other through the data communication bus.

The computer system may further include a network interface coupled to a network. The processor may be a central processing unit (CPU) or a semiconductor device which processes instructions stored in the memory and/or the repository.

The memory and the repository may include various forms of volatile or non-volatile storage media. For example, the memory may include a read-only memory (ROM) and a random access memory (RAM).

Therefore, the method of providing a microservice-based device control interface according to an exemplary embodiment of the present invention may be implemented in a computer-executable manner. When the method of providing a microservice-based device control interface according to an exemplary embodiment of the present invention is executed in a computer device, the method of providing a device control interface according to an exemplary embodiment of the present invention may be performed through computer-readable instructions.

Meanwhile, the above-described method of providing a microservice-based device control interface according to an exemplary embodiment of the present invention may be implemented as computer-readable codes in a computer-readable recording medium. The computer-readable recording medium includes any type of recording medium in which data that can be interpreted by a computer system is stored. For example, the computer-readable recording medium may be a ROM, a RAM, a magnetic tape, a magnetic disk, a flash memory, an optical data storage device, and the like. Also, the computer-readable recording medium may be distributed to computer systems, which are connected via a computer communication network, and may be stored and executed as codes that can be read in a distributed manner.

According to the present invention, it is possible to provide various communication interfaces using one gateway. Consequently, it is unnecessary to change gateways or purchase an additional module due to a communication interface, and a gateway is modularized in the form of a Docker-based microservice so that an optimal structure for edge computing may be provided.

Effects of the present invention are not limited to those mentioned above, and other effects which have not been mentioned should be clearly understood by those of ordinary skill in the art from the above descriptions.

The present invention has been described in detail above with reference to exemplary embodiments. Those of ordinary skill in the technical field to which the present invention pertains should be able to understand that various modifications and alterations can be made without departing from the essential features of the present invention. Therefore, it should be understood that the disclosed embodiments are not limiting but illustrative. The scope of the present invention is defined not by the above description but by the following claims, and it should be understood that all changes or modifications derived from the scope and equivalents of the claims fall within the scope of the present invention.

Figure 6:
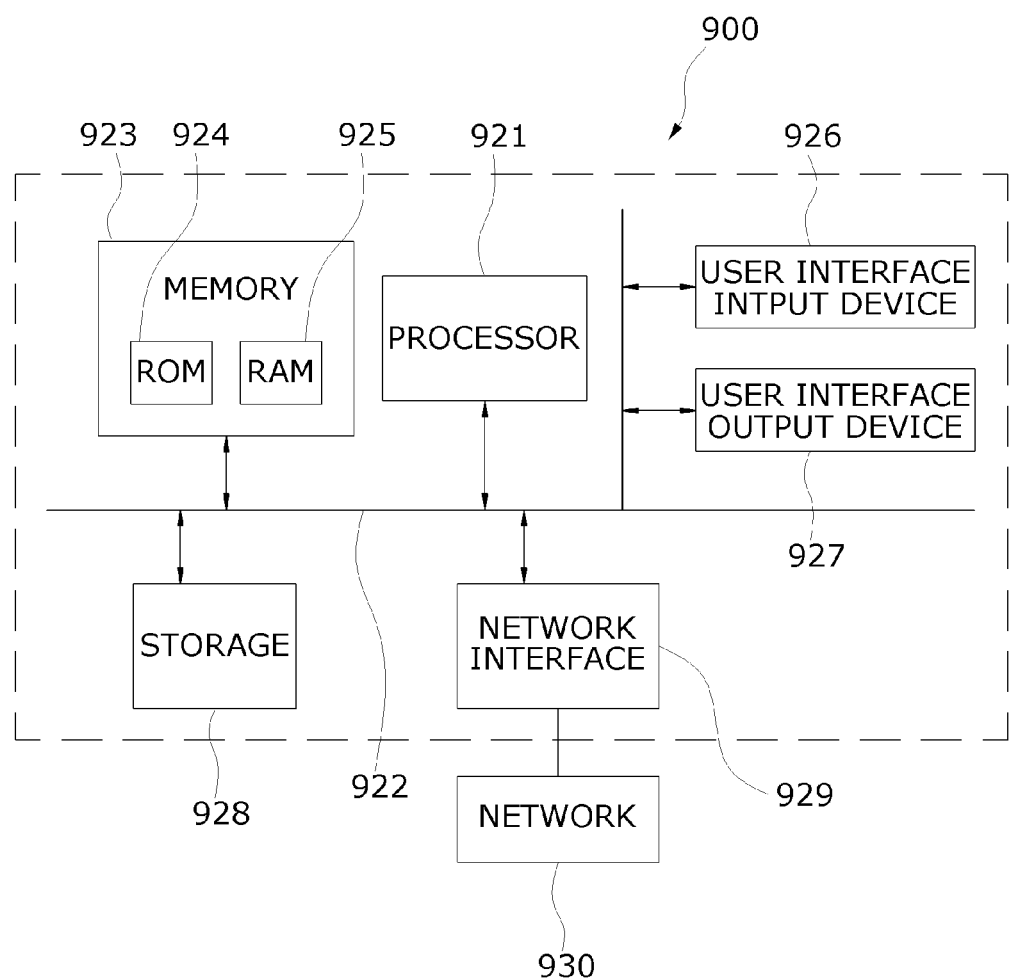
FIG. 6 is a view illustrating an example of a computer system in which a method according to an embodiment of the present invention is performed.

The method according to an embodiment of the present invention may be implemented in a computer system or may be recorded in a recording medium. FIG. 6 illustrates a simple embodiment of a computer system. As illustrated, the computer system may include one or more processors 921, a memory 923, a user input device 926, a data communication bus 922, a user output device 927, a storage 928, and the like. These components perform data communication through the data communication bus 922. Also, the computer system may further include a network interface 929 coupled to a network. The processor 921 may be a central processing unit (CPU) or a semiconductor device that processes a command stored in the memory 923 and/or the storage 928. The memory 923 and the storage 928 may include various types of volatile or non-volatile storage mediums. For example, the memory 923 may include a ROM 924 and a RAM 925. Thus, the method according to an embodiment of the present invention may be implemented as a method that can be executable in the computer system. When the method according to an embodiment of the present invention is performed in the computer system, computer-readable commands may perform the producing method according to the present invention.

What is claimed is:

1. A system for providing a microservice-based device control interface, the system comprising:
   a Docker registry server in which resources required for providing a device control interface are located; and
   a gateway configured to receive the resources from the Docker registry server, install the received resources, and provide a device control interface using a Docker-based microservice structure,
   wherein the gateway is hardware dependent on a control target device and implements a device interface by using a device-dependent circuit and connector which is removable as necessary.

2. The system of claim 1, wherein the resources including software and programmable semiconductor images required for communication protocols are located in the Docker registry server.

3. The system of claim 1, wherein the gateway installs software, a programmable semiconductor image, and image fusing software required for a communication protocol in a Docker container.

4. The system of claim 1, wherein the gateway checks hardware state information and determines whether a hardware state satisfies requirements of a device interface to be installed.

5. The system of claim 1, wherein the gateway downloads a programmable semiconductor image to a flash memory and executes device interface logic through a system reboot.

6. The system of claim 1, wherein the gateway controls and monitors the control target device and provides a service by transferring acquired data to another microservice in a Docker container.

7. A method of providing a microservice-based device control interface, the method comprising:
   (a) receiving resources required for implementing a device interface from a Docker registry server and installing the resources;
   (b) determining whether a gateway hardware state satisfies requirements of the device interface;
   (c) when it is determined in operation (b) that the gateway hardware state satisfies the requirements of the device interface, downloading a programmable semiconductor image to a flash memory;
   (d) rebooting a system to execute device interface logic; and
   (e) controlling and monitoring a control target device,
   wherein operation (d) comprises executing the device interface logic using interface protocol software installed in a Docker container and providing an interface for the control target device using a device-dependent circuit and connector connected through a general-purpose input/output (GPIO).

8. The method of claim 7, wherein operation (a) comprises receiving the resources including software and a programmable semiconductor image required for a communication protocol.

9. The method of claim 7, wherein operation (b) comprises checking hardware state information including at least one of a programmable semiconductor model, the number of gates, and an interface standard.

10. The method of claim 7, wherein operation (e) comprises transferring data acquired from the control target device to another microservice installed in a Docker container.

* * * * *